(12) United States Patent
Rodriguez Bravo (10) Patent No.: US 12,541,583 B2
(45) Date of Patent: Feb. 3, 2026

(54) AUTHENTICATION METHOD

(71) Applicant: Kyndryl, Inc., New York, NY (US)

(72) Inventor: Cesar Augusto Rodriguez Bravo, Alajuela (CR)

(73) Assignee: Kyndryl, Inc., York, NY (US)

( * ) Notice: Subject to any disclaimer, the term of this patent is extended or adjusted under 35 U.S.C. 154(b) by 181 days.

(21) Appl. No.: 18/236,779

(22) Filed: Aug. 22, 2023

(65) Prior Publication Data

US 2025/0068714 A1 Feb. 27, 2025

(51) Int. Cl.
*G06F 21/36* (2013.01)

(52) U.S. Cl.
CPC .................... *G06F 21/36* (2013.01)

(58) Field of Classification Search
CPC .............................. G06F 21/36; G06F 21/316
See application file for complete search history.

(56) References Cited

U.S. PATENT DOCUMENTS

| | | | | |
|---|---|---|---|---|
| 8,819,812 B1 * | 8/2014 | Weber | ...................... | G06F 3/017 726/19 |
| 8,970,348 B1 * | 3/2015 | Evans | ...................... | G06F 21/32 340/5.83 |
| 9,355,236 B1 * | 5/2016 | Kratz | ...................... | G06F 3/017 |
| 9,619,723 B1 * | 4/2017 | Chow | ...................... | G06V 40/45 |
| 10,303,863 B2 * | 5/2019 | Chatterton | ............ | G06F 21/316 |
| 10,417,402 B2 * | 9/2019 | Bradley | ................ | G06F 21/32 |
| 10,877,568 B2 * | 12/2020 | Huang | ................ | G06F 21/31 |
| 10,949,522 B2 * | 3/2021 | Gadge | ..................... | G06F 21/36 |
| 10,986,087 B2 * | 4/2021 | Watson | ................... | G06F 3/017 |
| 11,790,064 B2 * | 10/2023 | Chatterton | ............ | G06F 21/316 726/19 |
| 11,928,682 B2 * | 3/2024 | Pickering | ......... | G06Q 20/40145 |
| 12,093,358 B2 * | 9/2024 | Paeschke | ................ | G06F 21/32 |
| 2012/0007713 A1 * | 1/2012 | Nasiri | ................... | G06F 3/0233 455/574 |
| 2014/0310764 A1 * | 10/2014 | Tippett | .................... | G06F 21/31 726/1 |

(Continued)

FOREIGN PATENT DOCUMENTS

| | | |
|---|---|---|
| CN | 115362440 | 11/2022 |
| WO | 2023027683 | 3/2023 |
| WO | WO-2024200064 A1 * | 10/2024 ............. G06F 21/32 |

OTHER PUBLICATIONS

Mell et al., "The NIST Definition of Cloud Computing", NIST, Special Publication 800-145, Sep. 2011, 7 pages.

(Continued)

*Primary Examiner* — James R Turchen
(74) *Attorney, Agent, or Firm* — Erik Swanson; Andrew M. Calderon; Calderon Safran & Wright P.C.

(57) ABSTRACT

A computer-implemented method includes presenting one or more categories of movement patterns. The computer-implemented method includes recording a movement pattern of a user, where the movement pattern is associated with the one or more categories of movement patterns. The computer-implemented method includes authenticating the recorded movement pattern is correct. The computer-implemented method includes associating the authenticated recorded movement pattern with at least one of a device, application, and web-based service.

19 Claims, 7 Drawing Sheets

(56) References Cited

U.S. PATENT DOCUMENTS

| | | | | |
|---|---|---|---|---|
| 2015/0177842 | A1* | 6/2015 | Rudenko | G06F 3/017 |
| | | | | 345/156 |
| 2017/0180336 | A1* | 6/2017 | Josephson | G06F 21/32 |
| 2018/0012227 | A1* | 1/2018 | Tunnell | G06Q 20/40145 |
| 2018/0039990 | A1 | 2/2018 | Lindemann | |
| 2019/0253404 | A1 | 8/2019 | Briceno et al. | |
| 2019/0347394 | A1* | 11/2019 | Chatterton | G06F 21/316 |
| 2020/0117788 | A1* | 4/2020 | Mohammad | G06Q 20/405 |
| 2020/0364721 | A1* | 11/2020 | Pickering | G06V 40/20 |
| 2021/0374221 | A1* | 12/2021 | Markhasin | G06V 40/107 |
| 2022/0027439 | A1* | 1/2022 | Greenberger | H04W 12/68 |
| 2022/0217141 | A1 | 7/2022 | Arora et al. | |
| 2023/0083361 | A1 | 3/2023 | Zizi et al. | |
| 2024/0061920 | A1* | 2/2024 | Hoshino | G06V 20/52 |
| 2024/0134383 | A1* | 4/2024 | Nomura | G08G 1/09 |
| 2024/0338429 | A1* | 10/2024 | Einstein | G06F 21/31 |
| 2024/0378279 | A1* | 11/2024 | Li | G06V 40/20 |

OTHER PUBLICATIONS

Kupin et al., "Task-Driven Biometric Authentication of Users in Virtual Reality (VR) Environments", Clarkson University, Lecture Notes in Computer Science, Dec. 8, 2018, 12 pages.

Pinar Kürtünlüoğlu et al., "Security of Virtual Reality Authentication Methods in Metaverse: An Overview", DOI:10.48550/arXiv. 2209.06447Corpus ID: 252222552, Sep. 14, 2022, 5 pages.

Betrocci, "Authenticating Users in Your VR Apps", https://auth0. com/blog/authenticating-users-in-your-vr-apps/, Mar. 16, 2022, 16 pages.

Unknown, "AnvilDemoBlogMR70quality", https://share.vidyard. com/watch/an8UxF1whJLmpCwZdVD4v6?, date unknown, access date Aug. 22, 2023, 1 page.

Cimermanaite, "The AR and VR market size is predicted to reach $451.5 billion by 2030", Metaverse Post, Dec. 27, 2022, 5 pages.

\* cited by examiner

FIG. 6G

AUTHENTICATION METHOD

BACKGROUND

Aspects of the present invention relate generally to an authentication method and, more particularly, to an authentication method using virtual reality technologies.

Authentication is the process of verifying the identity of a user or device. Authorization is often a prerequisite to allowing access to resources in a computing environment. Accordingly, authentication ensures only those with authorized credentials gain access to secure systems, whether they be devices, services, web applications, etc.

There are many established authentication processes to access a user account on a website or a service provider. For example, before access to an account is granted, the user must prove they own the correct login credentials. This may include entering a username along with a password.

SUMMARY

In a first aspect of the invention, there is a computer-implemented method comprising: presenting, by a computing device, one or more categories of movement patterns; recording, by the computing device, a movement pattern of a user, the movement pattern being associated with the one or more categories of movement patterns; authenticating, by the computing device, that the recorded movement pattern is correct; and associating, by the computing device, the authenticated recorded movement pattern with at least one of a device, application, and web-based service.

In another aspect of the invention, there is a computer program product including one or more computer readable storage media having program instructions collectively stored on the one or more computer readable storage media. The program instructions are executable to: call a system to execute an authentication process; match a movement pattern provided by a user to a previously recorded authenticated movement pattern of the user; and provide an authentication successful token to authenticate the user device upon a successful match between the movement pattern and the previously recorded authenticated movement pattern of the user.

In another aspect of the invention, there is system including a processor, a computer readable memory, one or more computer readable storage media, and program instructions collectively stored on the one or more computer readable storage media. The program instructions are executable to: call a system to execute an authentication process; gather device information of a user device requesting authentication; correlate the device information against registered devices; request the user to execute an authentication movement pattern from a selected category; validate a movement pattern of the user matches the authentication movement pattern; and authenticate the user device to initiate an application from the user device upon the validation.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to an authentication method and, more particularly, to an authentication method using virtual reality technologies. In embodiments, for example, the authentication method comprises systems, methods and computer program products that leverage the unique features of virtual reality enabled devices by recording movements of a user which, in turn, are used to provide authentication processes/solutions. In this manner, implementations of the invention provide additional and robust layers of security (e.g., authentication processes) when trying to gain unauthorized access to devices, applications, and/or services as examples.

In more specific embodiments, the method, system and computer program product (hereinafter referred to generally as "method(s)" or "system(s)") integrates and leverages virtual reality enabled devices to provide authentication solutions. According to aspects of the invention, virtual reality technologies may include, for example, virtual reality (VR), augmented reality (AR), mixed reality (MR) or combinations thereof (hereinafter referred generally as "virtual reality"). Virtual reality is an interaction with a three-dimensional, simulated environment; whereas, augmented reality is a headset-free experience, where computerized elements are added to the real world around the user. The virtual reality may be non-immersive virtual reality, semi-immersive virtual reality or fully immersive virtual reality. The devices used with the present invention to record movements or patterns and for authentication of such movements or patterns may include, for example, virtual reality headsets (e.g., head-mounted display (HMD)) and/or other sensors used by a user, e.g., hand controllers to "touch" and manipulate virtual objects, accelerometers, gyroscopes, magnetometers, tracking cameras, laser tracking system, front-facing camera, etc.

By way of specific example, the authentication solutions may be based on recorded movement patterns of a user which, in turn, are used to authenticate devices during logging in to the device and/or other applications. The movements may be recorded by any of the above noted devices. In embodiments, the movement patterns can be any recorded movements as sensed in virtual reality technologies, e.g., eye movements, arm movements, or other body movements, etc. In addition to movements, the timing and frequency of the movements can be used in the authentication processes to add additional layers of entropy, e.g., a measure of the disorder or randomness in a closed system. These recorded movements can be used in authentication processes, including, e.g., access to applications, resources, web services, metaverse environments, crypto wallets, etc. The authentication process can also be integrated for other authentication requests such as, e.g., approving online (in-game) purchases.

Accordingly, in embodiments, the methods described herein provide technical features (e.g., technical solution) to a technical problem of preventing unauthorized access to data in a system. The technical features are integrated into a practical and significant application by leveraging and integrating virtual reality technologies in computing systems, e.g., user devices. For example, by leveraging and integrating virtual reality technologies into authentication processes it is now possible to provide robust layers of security to prevent unauthorized from gaining access to, e.g., computing system, applications, resources, web services, metaverse environments, crypto wallets, etc. And by using different patterns of movements, timing of such movements and frequency of such movements, it is possible to introduce a nth degree of entropy, e.g., a measure of the disorder or randomness in a closed system, into the authentication process. In fact, due to the countless movements which may be recorded and the timing and frequency of such movements, the methods described herein have an almost limitless amount of possibilities for authenticating a user which, in turn, significantly increases the security value in the authentication processes. In this way, additional layers of uncertainty is introduced thus making it more difficult for an unauthorized user to gain access to data in a system.

It should be understood that, to the extent implementations of the invention collect, store, or employ personal information provided by, or obtained from, individuals (e.g., movement of a user), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
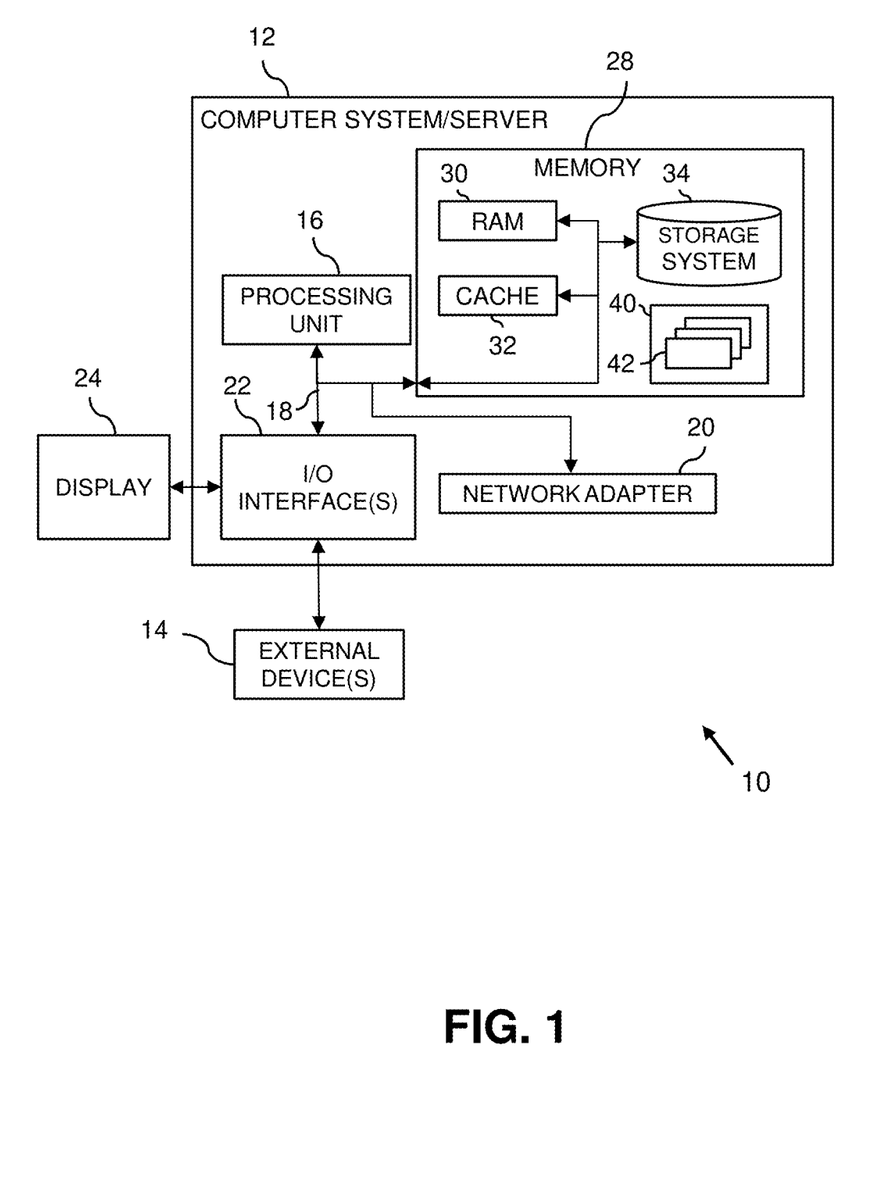
FIG. 1 depicts a cloud computing node according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
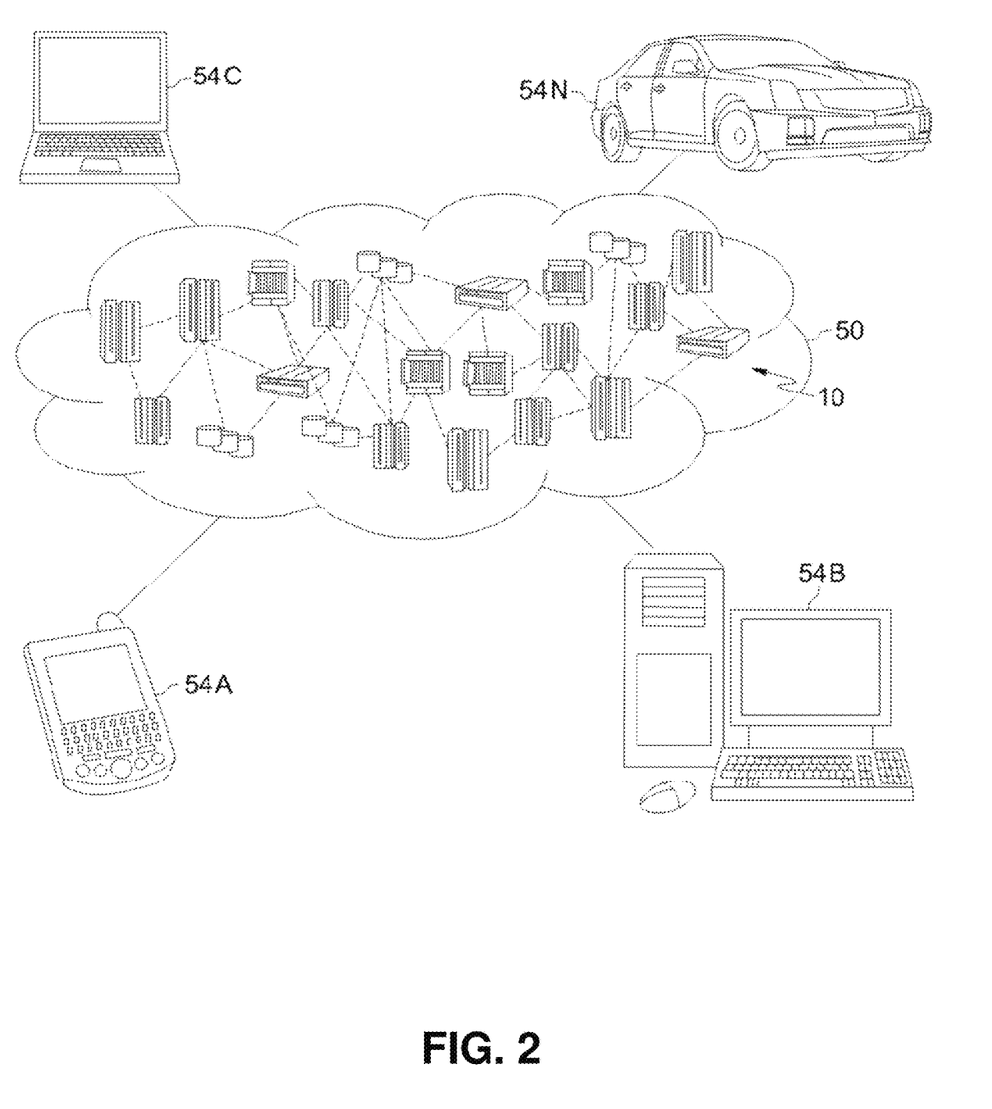
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
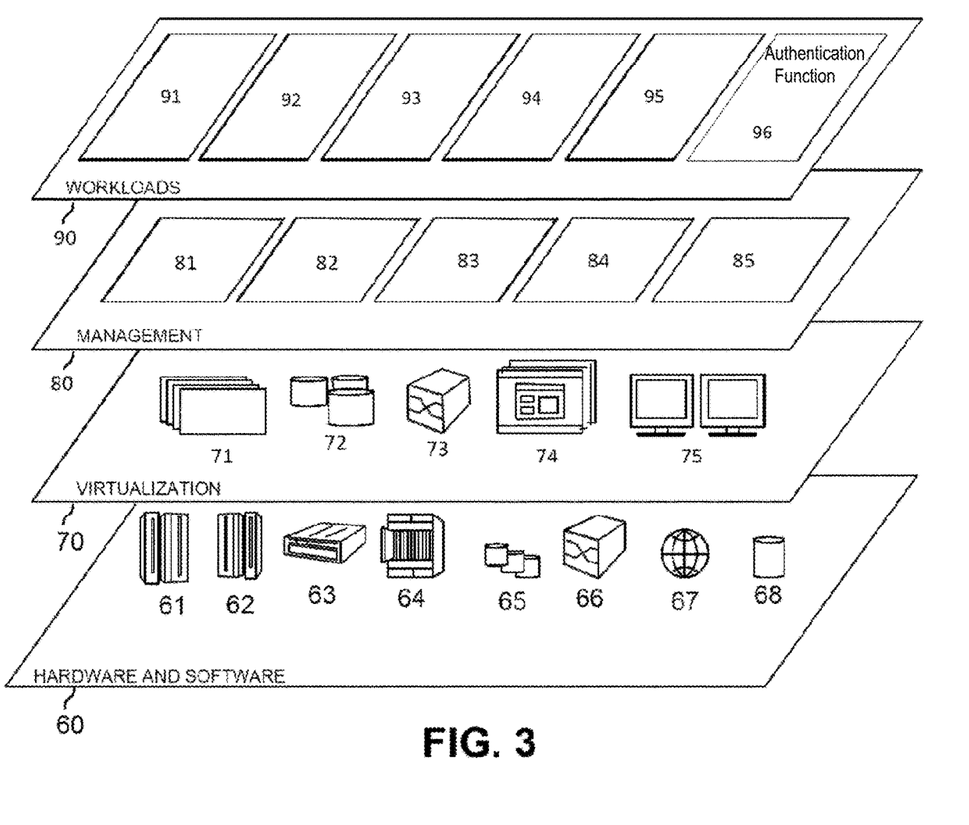
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication function 96.

Implementations of the invention may include a computer system/server 12 of FIG. 1 in which one or more of the program modules 42 are configured to perform (or cause the computer system/server 12 to perform) one of more functions of the authentication function 96 of FIG. 3. For example, the one or more of the program modules 42 may be integrated with virtual reality technologies, e.g., leverage Virtual Reality (VR), Augmented Reality (AR), Mixed Reality (MR) or combinations thereof, to create and execute authentication solutions. In embodiments, the authentication solutions are based on authenticated movement patterns recorded by a user using a virtual reality device. The movements can be any combination of body movements, drawing of shapes, sequences of events or actions, and can also introduce a timing and frequency attribute to increase the entropy of the system.

In an example, the one or more of the program modules 42 are configured to execute an authentication process by recording movement patterns from a user and correlating these recorded movement patterns to subsequent movement patterns during an authentication process. If there is a match between the recorded movement patterns and the current movement patterns, the one or more of the program modules 42 are configured to authenticate the user and allow access to the particular device, application, service, etc. If there is no match, the one or more of the program modules 42 will deny the user access to the particular device, application, service, etc.

It should also be understood by those of skill in the art that virtual reality devices have a high level of precision. For example, virtual reality devices can detect movements like walking by only using the hand controls. As the present invention uses such movements for authentication, the sensitive of the device may bring about false negatives. To overcome such problem, when the user is registering the authentication movement pattern, the one or more of the program modules 42 will create categories, which will allow the system to focus on a set of specific movements while ignoring others. For example, if the user selected body movement, then head movements will be ignored. This will greatly reduce the number of false negatives while enhancing the precision of the system. This actions ensure that (i) the authentication movement pattern is properly recorded, (ii) the user can successfully replicate the authentication movement pattern, and (iii) ensure that the system can successfully and precisely identify the authentication movement pattern.

Figure 4:
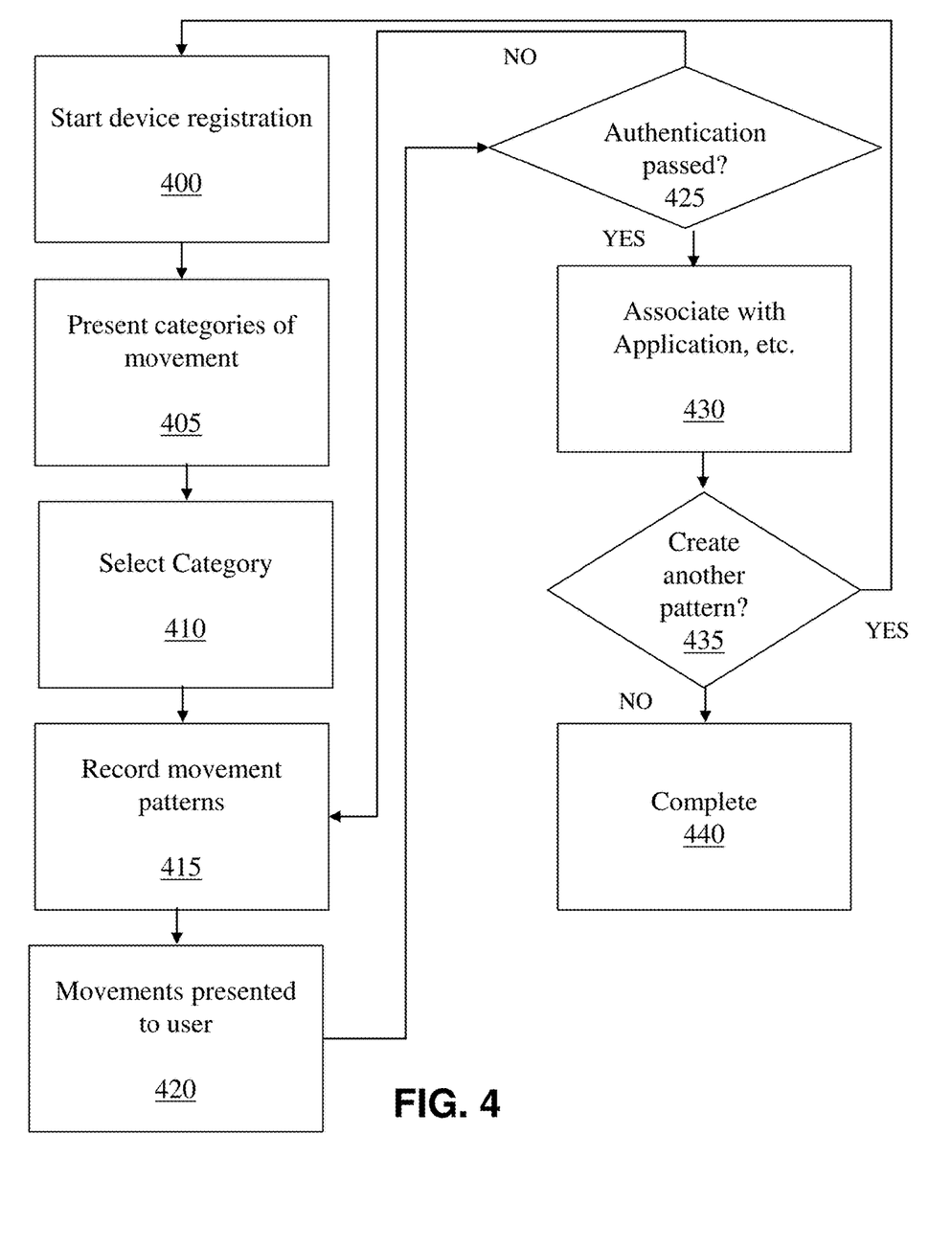
FIGS. 4 and 5 show flowcharts of exemplary methods in accordance with aspects of the invention.

FIG. 4 shows a flowchart of an exemplary method in accordance with aspects of the present invention. Steps of the method may be carried out in the environment of FIGS. 1-3. In particular, the flowchart shows and describes an enrollment process.

At step 400, the system starts the registration process. At step 405, the system presents a one or more predetermined categories to the user. These categories may be, for example, body movements (e.g., jumping, walking, etc.), head movement, arm or leg movements, finger sequences, different types of actions, e.g., placing both hands in front of a virtual reality system, drawings, etc. It should be understood by those of skill in the art that the categories can handle unlimited features including, for example, different sequences, timing, speed or combinations thereof in order to enhance the entropy of the system. It should further be understood that the user can also create their own categories.

At step 410, the user selects the category. The selection of categories by the user before executing the authentication works as a secondary authentication factor (with the movement, itself, as a primary authentication factor). In this way, an attacker not only need to guess the authentication movement but also the category, which exponentially increases the entropy of the system.

At step 415, the system records the movement patterns. In embodiments, the recordation process may be a repetitive process (e.g., recording same movements over a period of time) to train a machine learning engine to recognize the movement patterns. In embodiments, the machine learning engine may be a supervised machine learning algorithm, which trains a model on known input and output data. By way of a training example, the user will repeat the process (movements) several times until the system is completely trained.

As to the training, for example, at step 420, the system presents the challenge (e.g., authentication movement patterns provided by the user) to the user to confirm that the user can successfully recognize the recorded pattern. At step 425, the system will determine whether the authentication process has passed. This may be based on the recorded movement patterns being understood by the user, as an example. If the authentication has not passed, the system will revert back to step 415 to add more training to the system.

If the authentication has passed at step 425, the system proceeds to step 430. At step 430, the system will associate the authentication pattern with particular devices, applications, and/or services (e.g., web-based services) as examples. At step 435, the system will determine whether another pattern should be created. If so, the system will continue to step 400. If not, the registration process is complete (e.g., at step 440).

Figure 5:
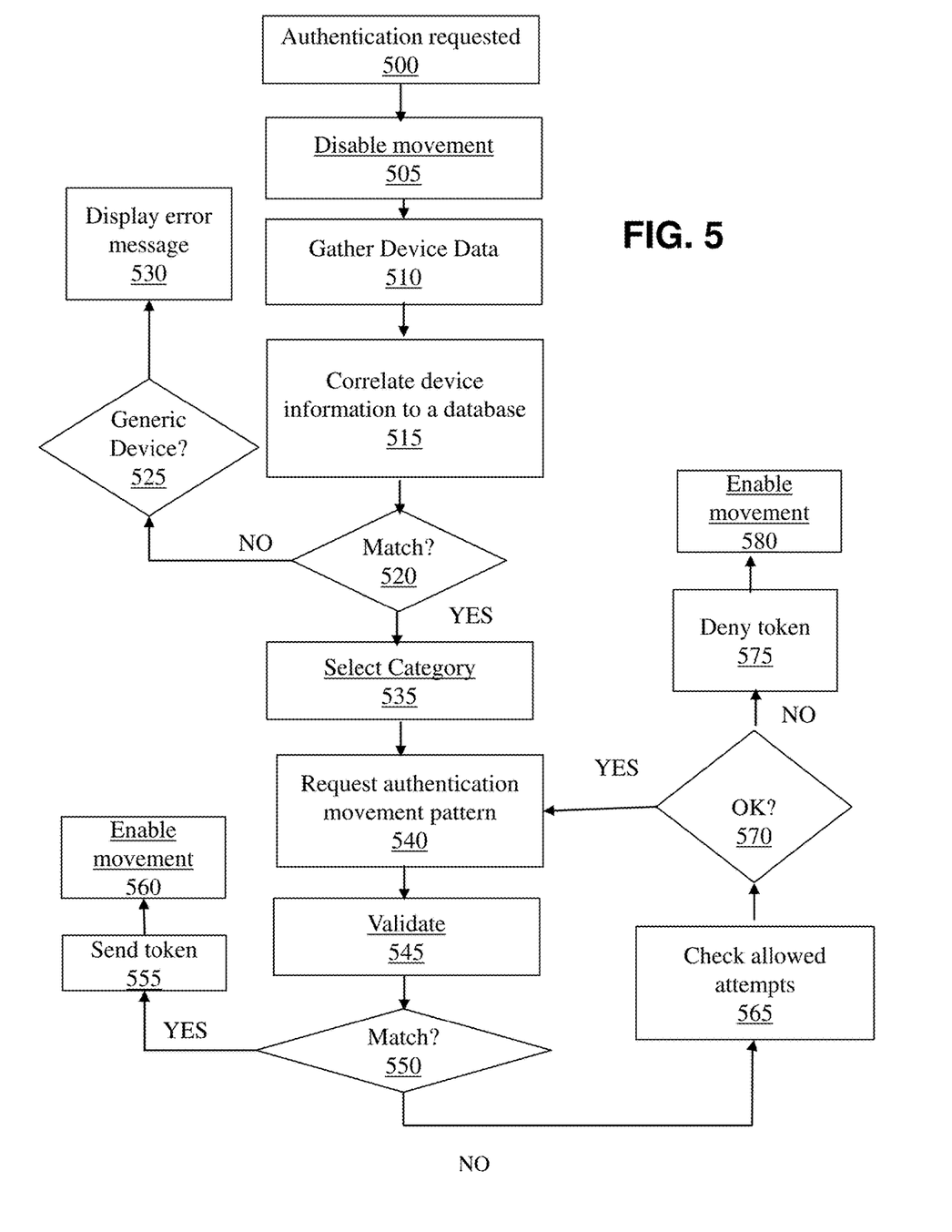

FIG. 5 shows a flowchart of an exemplary method describing an authentication process in accordance with aspects of the present invention. Steps of the method may be carried out in the environment of FIGS. 1-3. In particular, at step 500, the system is called by an application or other system (generally referred to as an "application") to execute an authentication process. At step 505, the system disables avatar movements. This is done for security purposes by ensuring that other users of the virtual reality technologies, e.g., users of avatars in a shared metaverse, cannot view the authentication movement patterns of the user. It should be understood by those of skill in the art that the step of disabling of the avatar may be eliminated in environments that do not have avatars, e.g., a web based application that does not utilize avatars. It should be understood by those of skill in the art that avatar disablement may be provided anytime prior to a request for movement patterns provided by the user, e.g., step 540.

At step 510, the system gathers device information and metadata. Metadata about a device can include, but is not limited to, inventory and configuration metadata such as name, model, firmware, type, serial number, etc. The information gathered will be used by the system to effectively detect the device. At step 515, the system will correlate the device information against devices registered on a secure user database. At step 520, the system will determine whether there is a match between the obtained device information and the registered device information. If there is no match, at step 525, the system will determine whether the user device is a generic device and, if yes, an error message is displayed at step 530.

If a match is found at step 520, the system proceeds to step 535. At step 535, the system presents a message requesting the user to select the category of the authentication as described herein. At step 540, the system will request from the user the authentication movement pattern. This may be performed by, for example, the system requesting the user to execute the authentication movement pattern.

At step 545, the authentication movement pattern is validated. This may be performed by validating the movement pattern matches the movements in a secure user database, e.g., storage system, 34 of FIG. 1, for a particular application or system, e.g., devices, applications, and/or services as already described herein. At step 550, the system will determine whether there is a match between the user's movement and the movement pattern saved in the secure database. If a match is found, at step 555, the system will send an authentication successful token to initiate the particular application or system. At step 560, avatar movement can be enabled.

If a match is not found at step 550, the system will proceed to step 565. At step 565, the system will check the number of attempts that user is allowed when accessing the particular application or system. If the number of attempts is below the number of tries, then the system will present to the user the request to execute the movement pattern again at step 540. On the other hand, if the number exceeds the number of allowed tries, the system will deny access by sending a denied or failed authentication token to the particular application or system, for example, at step 575. In this case, an error message may be display. At step 580, avatar movement may be enabled.

It should be understood by those of ordinary skill in the art that the disablement of the avatar will provide additional security. For example, the system is configured to avoid unauthorized users from obtaining authentication information from "shoulder surfing" by disabling the avatar. As one of skill in the art would understand, in computer security, shoulder surfing is a type of social engineering technique used to obtain information such as personal identification numbers (PINs), passwords and other confidential data by looking over a victim's shoulder. For example, shoulder surfing consists of an unauthorized users watching the keystrokes or other actions inputted on a device or listen to sensitive information being spoken, which is also known as eavesdropping. In the systems described herein, however, shouldering attacks in the virtual reality, e.g., Metaverse, are prevented from both physical users and virtual users. Both of these types of attacks are protected by (i) avatar movement being suspended during the authentication to prevent shouldering from other avatars; and (ii) a user is in constant movement while in the metaverse, so for other outsiders looking at the user is impossible to determine when the person is navigating and when the person is providing an authentication sequence because only the user performing the authentication will know (thru his VR headset) that is doing an authentication sequence.

FIGS. 6A-6G show different categories of movement patterns that may be selected by the user. It should be understood by those of ordinary skill in the art that the categories of different movement patterns shown in FIGS. 6A-6G is merely representative of several different categories preselected by the system or a user provided category. To this end, it should be understood by those of skill in the art that other categories are contemplated herein whether they be provided by the system for selection by the user or provided by the user. In addition, it is contemplated that different categories can be combined, or that sequences or timed events/actions may also be provided, all of which would increase the entropy of the system.

Figure 6A:
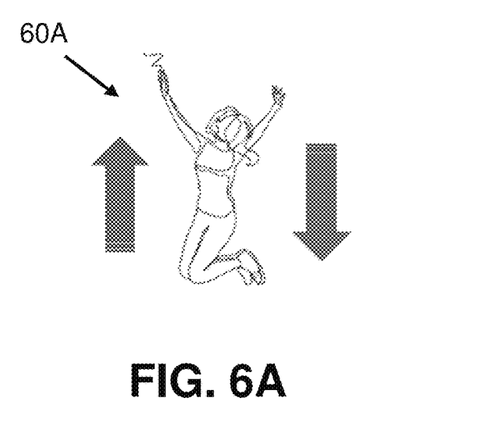
FIGS. 6A-6G show illustrative categories of patterns used for authentication in accordance with embodiments of the present invention.

By way of example, FIG. 6A shows illustrative body movements 60A. The illustrative body movements 60A may be jump up and down a set number of times. In embodiments, other body movements 60A are also contemplated herein including, for example, wiggling the hip, etc.

Figure 6B:
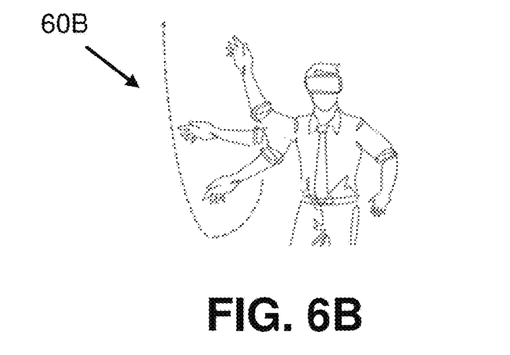

FIG. 6B shows illustrative arm movements 60B. For example, the pattern of arm movements may be wave your right arm three times. To enhance the entropy, coordination of the movement of the arm can also be configured as a pattern of authentication, for example, raise your right arm, then left arm twice, then right arm once, etc.

Figure 6C:
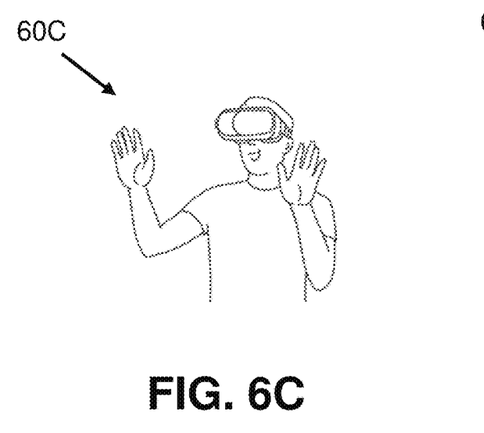

FIG. 6C shows illustrative actions 60C. For example, the actions 60C may include placing both hands in front of a virtual reality headset for a predetermined amount of time. In this case, time may be used to enhance the entropy of the system, e.g., wave both hands for a predetermined amount of time.

Figure 6D:
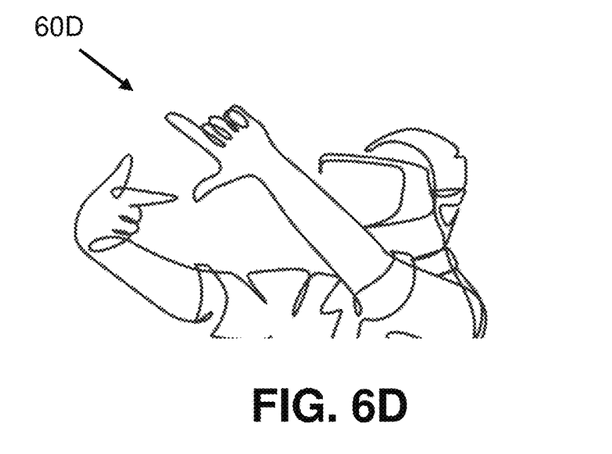

FIG. 6D shows illustrative shapes 60D that may be presented by the user. For example, the shapes 60D may comprise placing hands/arms/fingers in front of the virtual reality headset to create a shape, e.g., square.

Figure 6E:
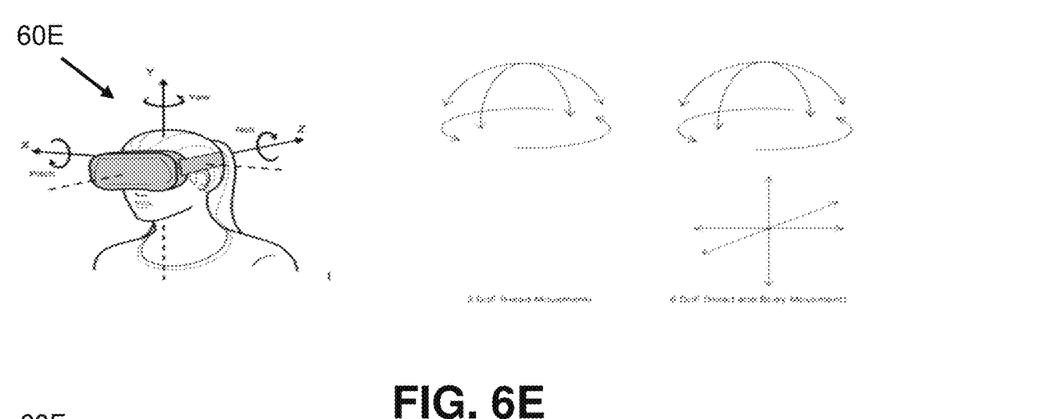

FIG. 6E shows illustrative head movements 60E. For example, the illustrative head movement 60E may include rotating of the head twice in one direction and once in another direction. Note that the movement may depend on the Degrees of freedom (DoF) supported by the device, as represented by the coordinate system. Also, the number of DoF will significantly increase the entropy of the system.

Figure 6F:
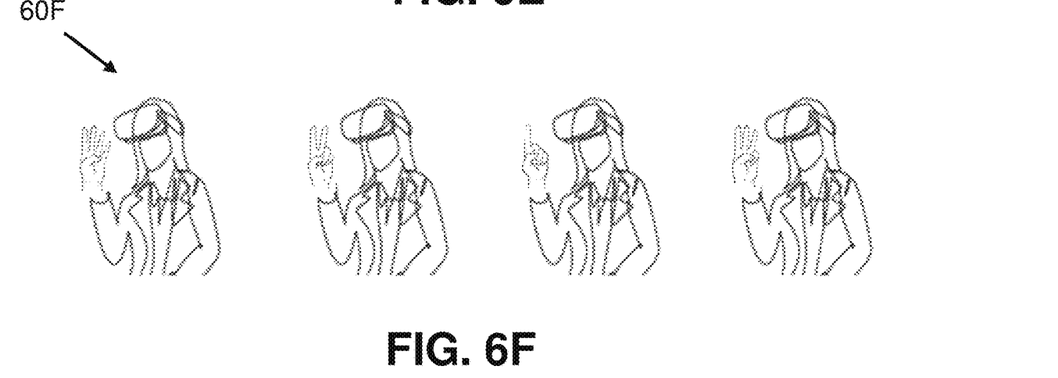

FIG. 6F shows illustrative finger sequences 60F. For example, the figure sequences 60F may include a count of the fingers placed in front of the virtual reality headset. In this example, the sequence may be four fingers, two fingers, one finger and three fingers. Here the entropy may be increased with two factors, i.e., the fingers used and the sequence.

Figure 6G:
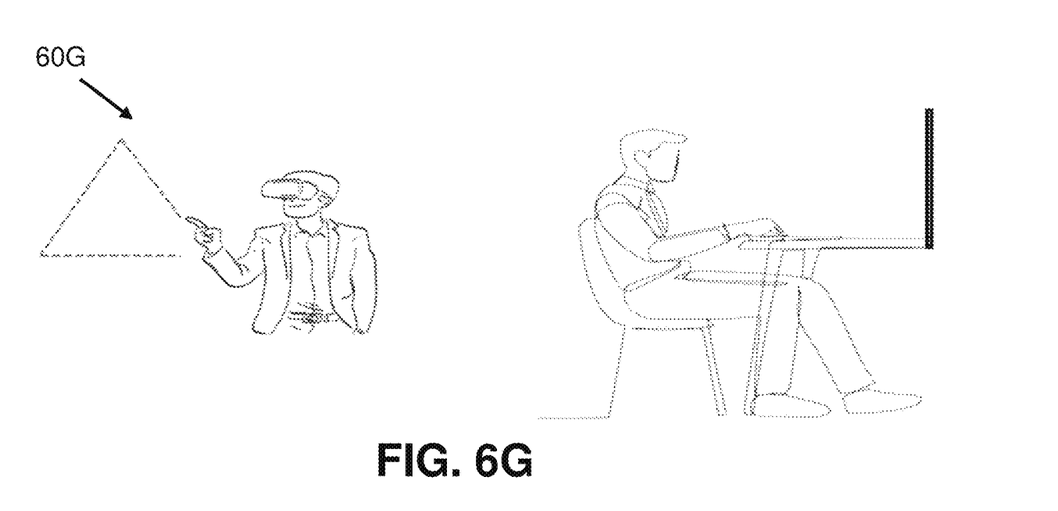

FIG. 6G shows illustrative shapes 60G that are drawn by the user. In this example, the shape 60G is a triangle, although other shapes are contemplated herein.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    disabling, by a computing device, movement of an avatar;
    gathering, by the computing device, device information corresponding to a user;
    determining, by the computing device, that the device information matches a registered device on a secure user database;
    displaying, by the computing device, a message requesting the user to select a category of an authentication in response to determining that the device information matches the registered device;
    recording, by the computing device, a movement pattern of the user, the movement pattern being associated with one or more categories of movement patterns;
    authenticating, by the computing device, that the recorded movement pattern is correct; and
    associating, by the computing device, the authenticated recorded movement pattern with at least one of a device, application, and web-based service.

2. The method of claim 1, further comprising:
    presenting, by the computing device, the recorded movement pattern to the user for confirmation that the user recognizes the recorded movement pattern; and
    executing, by the computing device, an authentication process which disables avatar movements of the user.

3. The method of claim 2, further comprising:
    additional recording of the movement pattern to train a machine learning algorithm to recognize the movement pattern of the user; and
    enabling, by the computing device, the avatar movements of the user in response to an authentication successful token being provided for authentication of a user device associated with the user.

4. The method of claim 1, wherein the recorded movement pattern is a primary authentication factor and selection by a user of the one or more categories of movement patterns before executing the authentication is a secondary authentication factor.

5. The method of claim 1, wherein the one or more categories of movement patterns comprises at least one of body movement, head movement, arm or leg movement, and sequences of actions.

6. The method of claim 1, wherein the one or more categories of movement patterns comprises user created categories.

7. The method of claim 1, wherein the one or more categories of movement patterns comprises predetermined categories.

8. The method of claim 1, wherein the recording includes different sequences, timing, speed or combinations thereof to enhance entropy.

9. The method of claim 1, further comprises calling an application or system to execute an authentication process and disabling avatar movements.

10. The method of claim 1, further comprising:
validating a movement pattern of the user by matching the movement pattern of the user with the authenticated recorded movement pattern;
providing an authentication successful token to provide authorization for the user device; and
enabling avatar movement.

11. A computer program product comprising one or more computer readable storage media having program instructions collectively stored on the one or more computer readable storage media, the program instructions executable to:
call a system to execute an authentication process;
disable movement of an avatar;
gather device information corresponding to a user;
determine that the device information matches a registered device on a secure user database;
display a message requesting the user to select a category of an authentication in response to determining that the device information matches the registered device;
match a movement pattern provided by the user to a previously recorded authenticated movement pattern of the user; and
provide an authentication successful token to authenticate the user device upon a successful match between the movement pattern and the previously recorded authenticated movement pattern of the user.

12. The computer program product of claim 11, wherein the providing of the authentication successful token to authenticate the user device is provided upon a match between information from the user device to device information stored in the storage system.

13. The computer program product of claim 11, further comprising:
checking a number of attempts the user is allowed to provide the movement pattern and if the number is exceeded, deny authentication of the user device, and the executing the authentication process comprises disabling avatar movements of the user.

14. The computer program product of claim 11, further comprising:
checking a number of attempts the user is allowed to provide the movement pattern and if the number is not exceeded, allow the use to provide additional movement patterns until the number has been exceeded or authentication of the user device has been granted; and
enabling the avatar movements of the user in response to the authentication successful token being provided to authenticate the user device associated with the user.

15. The computer program product of claim 11, further comprising disabling an avatar prior to the matching and enabling the avatar after the authentication for the user device is denied or granted.

16. The computer program product of claim 11, wherein the movement pattern is selected from one or more categories during enrollment and the authentication process.

17. A system comprising:
a processor, a computer readable memory, one or more computer readable storage media, and program instructions collectively stored on the one or more computer readable storage media, the program instructions executable to:
call a system to execute an authentication process;
disable movement of an avatar;
gather device information of a user device requesting authentication;
correlate the device information against registered devices;
determine that the device information matches a registered device of the registered devices on a secure user database;
display a message requesting the user to select a category of an authentication in response to determining that the device information matches the registered device;
request the user to execute an authentication movement pattern from the selected category;
validate a movement pattern of the user matches the authentication movement pattern; and
authenticate the user device to initiate an application from the user device upon the validation.

18. The system of claim 17, wherein the authentication movement pattern is recorded by the user during an enrollment process.

19. The system of claim 17, further comprising disabling avatar movement prior to the validating.

* * * * *